(12) United States Patent
Liang et al.

(10) Patent No.: US 10,150,534 B2
(45) Date of Patent: Dec. 11, 2018

(54) MOTORIZED GEAR REDUCER

(71) Applicant: PRODRIVES & MOTIONS CO., LTD., Taipei (TW)

(72) Inventors: Chia-Sheng Liang, Taipei (TW); Chu-Hsiang Tseng, Taipei (TW)

(73) Assignee: PRODRIVES & MOTIONS CO., LTD., Taipei (TW)

( * ) Notice: Subject to any disclaimer, the term of this patent is extended or adjusted under 35 U.S.C. 154(b) by 131 days.

(21) Appl. No.: 15/456,467

(22) Filed: Mar. 10, 2017

(65) Prior Publication Data
US 2017/0267314 A1    Sep. 21, 2017

(30) Foreign Application Priority Data

Mar. 15, 2016    (TW) .............................. 105107913 A

(51) Int. Cl.
| | |
|---|---|
| *H02K 7/116* | (2006.01) |
| *B62M 11/14* | (2006.01) |
| *B62M 6/55* | (2010.01) |
| *F16H 3/66* | (2006.01) |
| *F16H 37/08* | (2006.01) |

(52) U.S. Cl.
CPC ............ *B62M 11/145* (2013.01); *B62M 6/55* (2013.01); *F16H 3/666* (2013.01); *F16H 37/0826* (2013.01); *H02K 7/116* (2013.01); *F16H 2200/0034* (2013.01)

(58) Field of Classification Search
None
See application file for complete search history.

(56) References Cited

U.S. PATENT DOCUMENTS

| | | | | |
|---|---|---|---|---|
| 4,274,023 | A  * | 6/1981 | Lamprey ................ | H02K 7/116 310/83 |
| 6,196,347 | B1 | 3/2001 | Chao et al. | |
| 6,296,072 | B1 | 10/2001 | Turner | |
| 6,629,574 | B2 | 10/2003 | Turner | |
| 7,886,858 | B2 * | 2/2011 | Ai ........................ | B60K 7/0007 180/65.51 |
| 8,245,804 | B2 * | 8/2012 | van Rooij ................ | B62M 6/65 180/65.51 |
| 9,879,760 | B2 * | 1/2018 | Tesar ...................... | H02K 7/116 |
| 10,035,561 | B2 * | 7/2018 | Spaggiari ................ | B62M 6/55 |

* cited by examiner

*Primary Examiner* — Dirk Wright
(74) *Attorney, Agent, or Firm* — Chung-Ming Shih

(57) ABSTRACT

A motorized gear reducer is provided with a hollow motor in the housing and including an annular rotor having a through hole, and a shaft passing through the through hole; and a planetary gear train in the through hole and placed on the shaft, the planetary gear train including a sun gear assembly having a first sun gear in the housing, and a second sun gear on the shaft; planet gear assemblies equally spaced apart around the sun gear assembly, each including a first planet gear meshing with the first sun gear, and a second planet gear coaxially disposed with the first planet gear and meshing with the second sun gear; and a ring gear on an inner surface of the rotor. A speed reduction ratio of a first stage and a speed reduction ratio of a second stage are rendered.

14 Claims, 7 Drawing Sheets

MOTORIZED GEAR REDUCER

BACKGROUND OF THE INVENTION

1. Technical Field

The invention relates to electric motors and reduction gears and more particularly to a motorized gear reducer having improved characteristics.

2. Related Art

A motorized gear reducer is a combination of an electric motor and a reduction gear set. For tools or devices having the need of speed reduction, a motorized gear reducer can provide low speed and high torque output for saving labor or increasing thrust. For an electric bicycle equipped with a motorized gear reducer, its low speed and high torque output can save a rider's labor on an up-hill road. Details of an electric bicycle equipped with a motorized gear reducer can be found in U.S. Pat. Nos. 6,196,347, 6,296,072 and 6,629,574.

Typically, a motorized gear reducer with a reduction gear set is characterized in that a pinion is operatively connected to a motor shaft of a hub motor, and a gear (or a gear train) meshes with the pinion; or a worm gear is operatively connected to a motor shaft of a hub motor. Finally, a speed reduced output is made possible. Specifically, U.S. Pat. Nos. 6,196,347, 6,296,072 and 6,629,574 each discloses that a planetary gear train is operatively connected to a motor shaft of a hub motor for speed-reduced output. More specifically, U.S. Pat. No. 6,196,347 discloses a Ferguson's mechanical paradox gear in a motorized gear reducer. More specifically, U.S. Pat. Nos. 6,296,072 and 6,629,574 each discloses a two-stage gear reduction mechanism. However, all of above patents are bulky due to the excessive length of the motor shaft. Therefore they are not applicable to bicycles having limited longitudinal length.

For reducing the size of a motorized gear reducer, a planetary gear train pancake motor is developed (see http://www.haydonkerk.com/LinearActuatorProducets/Stepper-MotorLinearActuators/RotaryStepperMotors//PancakeRo-taryMotors/PlanetaryPancakeMotors/tabid/107/Default.aspx#ballbearing). It discloses a rotor in a motor housing axially connected to a sun gear, other components of a planetary gear train disposed in a central area of the hollow type motor housing to achieve pancake motor design having one stage speed reduction. In detail, an internal gear (called annular gear or ring gear meshing with the planet gears at outer side), shaped as an outer ring, is located inside the rotor and secured to the motor housing. In short, it simply mounts a conventional planetary gear train in a motor housing for the purpose of decreasing length of the motor shaft. However, it does not decrease the volume of the planetary gear train pancake motor. To the worse, it adversely increases the number of components and greatly increases the manufacturing cost. Further, only a single stage speed reduction is possible.

U.S. Pat. Nos. 6,296,072 and 6,629,574 each discloses two planet gears meshing with two sun gears respectively for rendering a two-stage speed reduction mechanism. However, both patents do not teach a volume reduction of the motorized gear reducer.

One skilled in the art may use the disclosures of both U.S. Pat. Nos. 6,296,072 and 6,629,574 (i.e., two-stage speed reduction mechanism) to convert one-stage speed reduction in a motor housing of a planetary gear train pancake motor into a planetary gear train having the two-stage gear reduction mechanism. However, the following problems still exist: How to cause a motor rotor to drive planet gears or ring gear of a planetary gear train. How to mount a planetary gear train having a two-stage gear reduction mechanism in an electric motor within a limited space.

Thus, the need for improvement still exists.

BRIEF SUMMARY

It is desirable to provide an improved motorized gear reducer which addresses the above described problems including a bulky, increased axial length of the motor with one or two stage speed reduction.

It is therefore a first preferred embodiment of the invention to provide a motorized gear reducer comprising a housing; a hollow motor disposed in the housing and including an annular rotor having a through hole, a shaft, rotatably fastened through the housing, passing through the through hole, and a plurality of drive elements mounted on the annular rotor; and a planetary gear train disposed in the through hole of the annular rotor and placed on the shaft, the planetary gear train including a sun gear assembly having a first sun gear mounted in the housing, and a second sun gear mounted on the shaft; a plurality of planet gear assemblies equally spaced apart around the sun gear assembly, each including a first planet gear meshing with the first sun gear, and a second planet gear coaxially disposed with the first planet gear and meshing with the second sun gear; and a ring gear disposed on an inner surface of the rotor; wherein the rotor activates to rotate the first planet gears via the ring gear so that each first planet gear rotates upon itself, each second planet gear rotates upon itself, and both the first and second planet gears rotate about the sun gear assembly to render a speed reduction ratio of a first stage; and the second planet gears meshing with the second sun gear rotates the shaft to render a speed reduction ratio of a second stage.

Preferably, the number of teeth of the first sun gear is different from that of the second sun gear.

Preferably, a modulus of the first planet gear is different from that of the second planet gear.

Preferably, the drive elements include an annular magnet placed on the annular rotor, and an annular stator placed on the annular magnet and fastened in the housing.

Preferably, further comprises two planet gear discs disposed on two ends of the planet gear assemblies respectively, and wherein the first and second planet gears of each planet gear assembly revolve about the sun gear assembly.

Preferably, each planet gear assembly further comprises an axle disposed through the first and second planet gears, and wherein the ends of the planet gear assemblies are positioned by the planet gear discs.

By utilizing the motorized gear reducer of the first object of the invention, the following advantages are obtained: A toothed member is formed on an inner surface of a motor rotor as a replacement of a conventional ring gear and in turn it can decrease the number of components and save space. The number of teeth of each component of the sun gear assembly and the planet gear assemblies is designed to effect a speed reduction ratio of two stages. It fully utilizes the limited space with improved performance. Both the construction and the mechanism are simplified. The motorized gear reducer can be made compact so as to mount a vehicle or device having the need of speed reduction.

It is therefore a second preferred embodiment of the invention to provide a motorized gear reducer. The characteristics of the motorized gear reducer of the second object of the invention are substantially the same as that of the first object of the invention except the following: There are no teeth on an inner surface of a rotor to transmit torque to the first planet gears. Instead, two planet gear discs are provided on two ends of the rotor respectively. The planet gear assemblies are thus positioned as a virtual ring and equally spaced apart one another on the sun gear assembly. Torque can be transmitted from the rotor to the planet gear assemblies via the planet gear discs. As a result, a speed reduction ratio of a single stage is made possible.

The motorized gear reducer of the second object of the invention further comprises characteristics of comprising a toothed portion formed on either end of the annular rotor, and a toothed member formed on an edge of each planet gear disc, and wherein the toothed member meshes with the toothed portion.

By utilizing the motorized gear reducer of the second object of the invention, the following advantages are obtained: The rotor of the motor and the planet gear discs of the planetary gear train are combined as one with the ring gear being eliminated and the planet gear assemblies being incorporated thereinto. It can decrease the number of components and save space. Further, it can increase the speed reduction ratio, simplify both the construction and the mechanism, and make the motorized gear reducer compact the same as that of the motorized gear reducer of the first object of the invention.

In addition to small devices and tools, one particular application of the motorized gear reducer of each of the first and second objects of the invention is bicycle. In short, the motorized gear reducer is used as a power source in addition to the pedaling. Therefore, the shaft is implemented as a crank shaft rotatably disposed through a bottom bracket shell of the bicycle, and the housing is secured to one end of the bottom bracket shell. It is noted that the invention is not limited to above applications.

BRIEF DESCRIPTION OF THE DRAWINGS

These and other features and advantages of the various embodiments disclosed herein will be better understood with respect to the following description and drawings, in which like numbers refer to like parts throughout, and in which.

DETAILED DESCRIPTION

Figure 1:
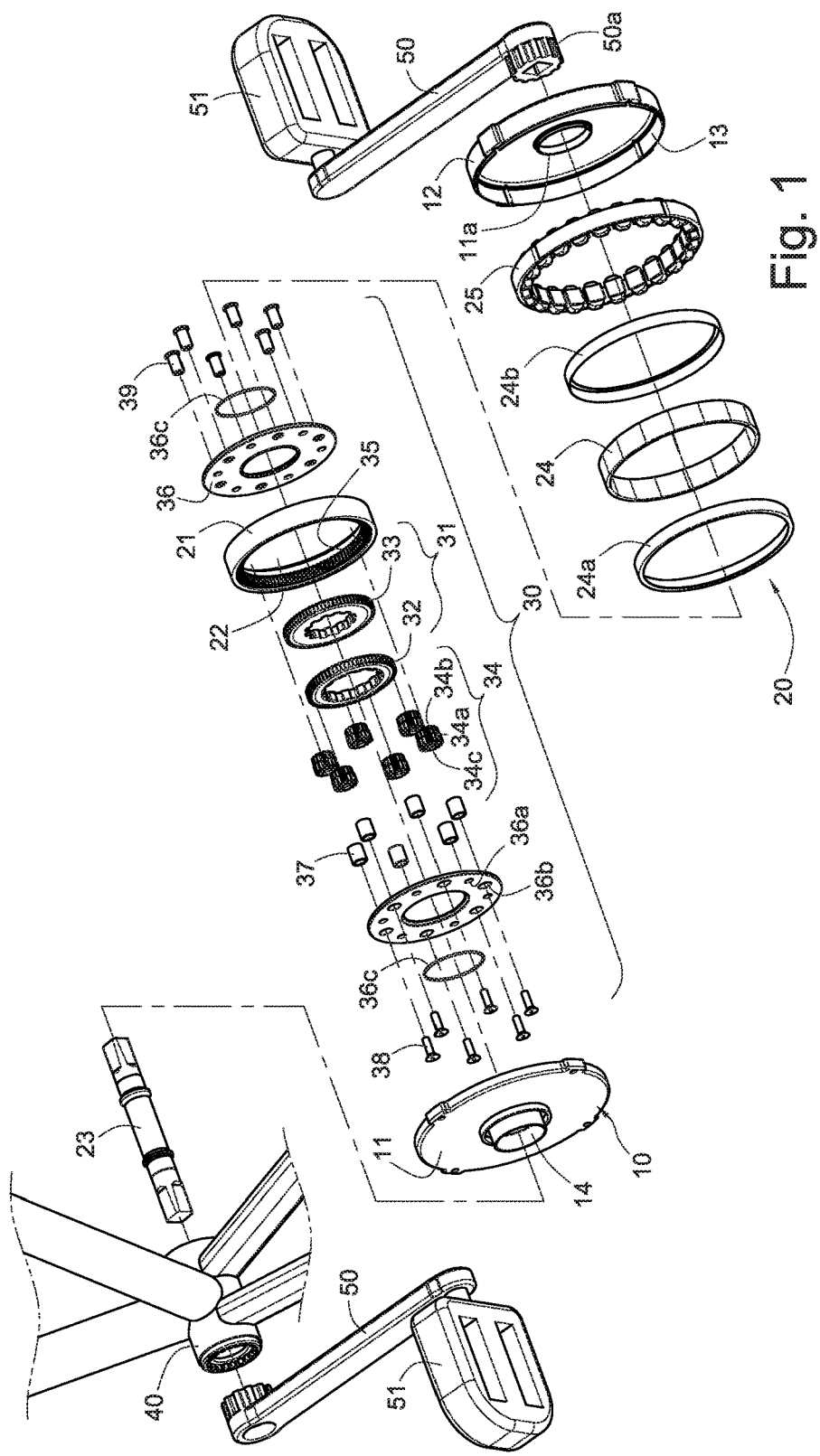
FIG. 1 is an exploded view of a motorized gear reducer according to a first preferred embodiment of the invention.
Figure 2:
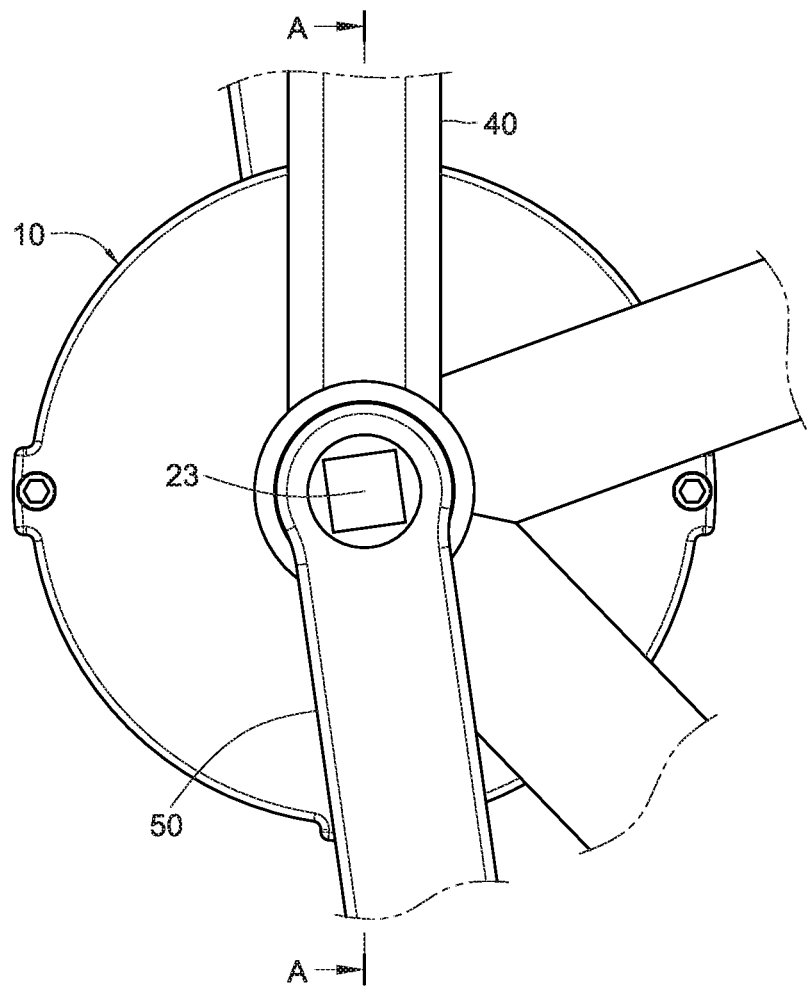
FIG. 2 is a side elevation of the assembled motorized gear reducer.
Figure 3:
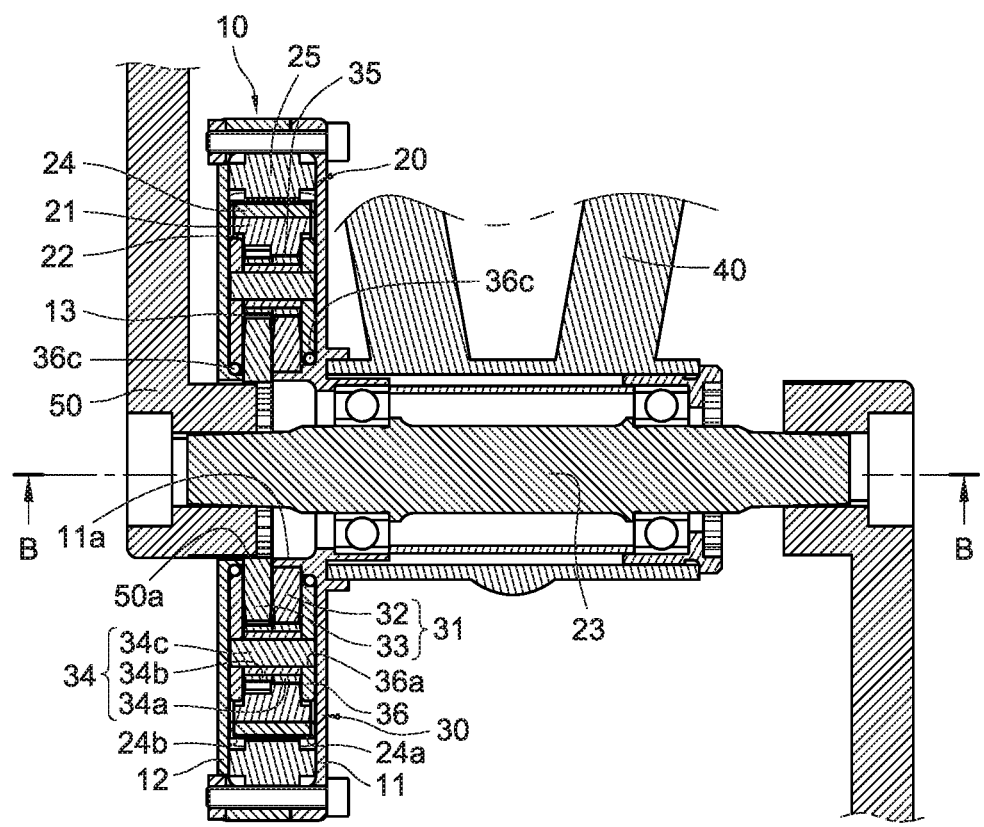
FIG. 3 is a sectional view taken along line A-A of FIG. 2.
Figure 4:
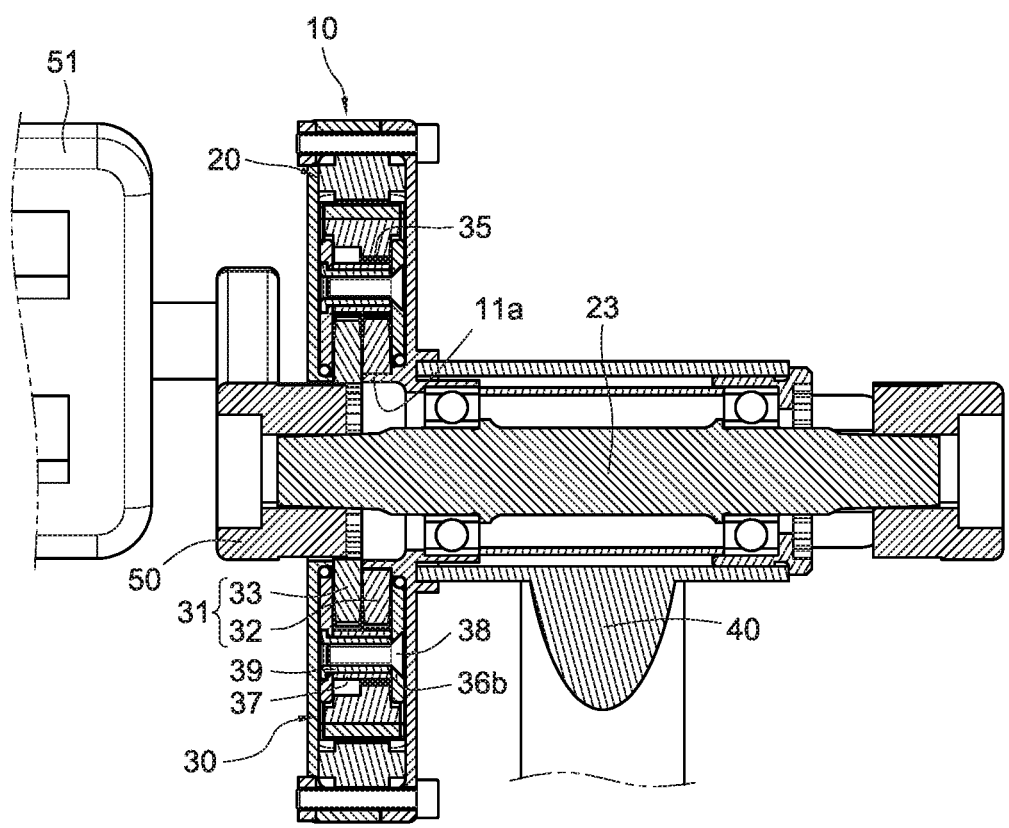
FIG. 4 is a sectional view taken along line B-B of FIG. 3.

Referring to FIGS. 1 to 4, a motorized gear reducer in accordance with a first preferred embodiment of the invention is mounted in a bottom bracket shell 40 of a bicycle. The motorized gear reducer comprises a housing 10, a motor 20, and a planetary gear train 30. As shown in FIGS. 1 and 3, the housing 10 comprises a first shell 11, a second shell 12 threadedly secured to the first shell 11, and an internal space 13. The motor 20 and the planetary gear train 30 are mounted in the space 13 and fastened in the housing 10. The housing 10 is mounted to one end of the bottom bracket shell 40.

The motor 20 is hollow and functions as a power source of the motorized gear reducer. The motor 20 comprises an annular rotor 21 including a through hole 22 with a shaft 23, rotatably fastened through the housing 10, passing through. A hole 14 is formed through a central portion of each of the first shell 11 and the second shell 12 so that the shaft 23 may pass through the holes 14. Torque can be transmitted to bicycle wheels via sprockets and trains. In detail, the shaft 23 is implemented as crank shaft pivotably mounted through the bottom bracket shell 40. Two crank arms 50 are secured to two ends of the shaft 23 respectively. Further, two pedals 51 each are mounted at one end of the crank arm 50.

The motor 20 further comprises a plurality of drive elements mounted on the annular rotor 21. The drive elements include an annular magnet 24 placed on the annular rotor 21, and an annular stator 25 placed on the annular magnet 24 and fastened in the housing 10. The annular magnet 24 is covered by first and second fastening rings 24a, 24b. Thus, the annular magnet 24 is fastened between the rotor 21 and the stator 25. According to Ampere's law, current, supplied from a power supply and controlled by a controller, passes through a wire (e.g., windings of the stator 29) produces a magnetic field. Further, the magnetic field interacts with the magnetic field of the magnet 24 to rotate the annular rotor 21, i.e., the motor 20 being rotated.

As shown in FIGS. 1 and 3, the planetary gear train 30 is disposed in the through hole 22 of the rotor 21 and placed on the shaft 23. The planetary gear train 30 includes a sun gear assembly 31, a plurality of planet gear assemblies 34, and a ring gear 35. The sun gear assembly 31 includes a first sun gear 32 mounted in the housing 10, and a second sun gear 33 mounted on the shaft 23. An annular toothed member 50a is formed on an end of each crank arm 50. One of the annular toothed members 50a is secured to the second sun gear 33. Thus, the second sun gear 33, the crank arms 50, and the shaft 23 are fastened together. The second sun gear 33 rotates to turn the shaft 23 via the crank arms 50. The first sun gear 32 is fastened in the housing 10. The first shell 11 of the housing 10 has the shaft 23 passing through. An annular flange 11a is formed on an inner surface of the hole 14 of the first shell 11. The first sun gear 32 is secured to the flange 11 an and in turn secured to the housing 10. In this embodiment, the first sun gear 32 and the second sun gear 33 are concentric. The first sun gear 32 and the second sun gear 33 are axially disposed, the second sun gear 33 placed on the shaft 23 is rotatable, and the first sun gear 32 fastened in the housing 10 is fixed. In detail, the fixed first sun gear 32 is used to guide the second planet gear by means of its outer teeth (as discussed later).

In practice, there are six planet gear assemblies 34 equally spaced apart on the sun gear assembly 31. In detail, two planet gear discs 36 are provided on two ends of the planet gear assemblies 34 respectively. The planet gear assemblies 34 are thus positioned as a virtual ring and equally spaced apart one another on the sun gear assembly 31. The planet gear assembly 34 includes a first planet gear 34a, a second planet gear 34b coaxially disposed with the first planet gear 34a, and an axle 34c disposed through centers of the first planet gear 34a and the second planet gear 34b. In detail, a bearing or a bushing is provided on the axle 34c so as to coaxially assemble the first planet gear 34a and the second planet gear 34b. The planet gear disc 36 includes a plurality of first holes 36a equally spaced apart, and a plurality of second holes 36b equally spaced apart in which the second hole 36b is greater than the first hole 36a, each second hole 36b is disposed between two adjacent first holes 36a, and the number of the first holes 36a is equal to the number of the planet gear assemblies 34. A plurality of hollow cylinders 37 are disposed through the second holes 36b of one planet gear disc 36 and a plurality of screws 38 are driven through the hollow cylinders 37 respectively. A plurality of fasteners 39 are disposed through the second holes 36b of the other planet gear disc 36. The screws 38 are further secured to the fasteners 39. Thus, the planet gear discs 36 and the planet gear assemblies 34 are assembled.

Two sets of a plurality of steel balls (functioned as ball bearings) 36c are provided in which one set of steel balls 36c are provided between the first shell 11 and one planet gear disc 36 and the other set of steel balls 36c are provided between the second shell 12 and the other planet gear disc 36. Thus, the planet gear discs 36 are able to rotate in the housing 10. Further, the first planet gear 34a and the second planet gear 34b of each planet gear assembly 34 are contained by the planet gear discs 36 and are in turn capable of rotating about the sun gear assembly 31.

As shown in FIG. 2, the first gear 34a meshes with the first sun gear 32, the second gear 34b meshes with the second sun gear 33, the first gear 34a and the second gear 34b are capable of rotating about the axle 34c, and in turn the planet gear assemblies 34 rotate about the sun gear assembly 31. Alternatively, the first gear 34a and the second gear 34b are formed integrally and together they rotate about the axle 34c, and in turn the planet gear assemblies 34 rotate about the sun gear assembly 31.

The ring gear 35 is formed on an inner surface of the annular rotor 21 and the rotor 21 meshes with the first planet gears 34a via the ring gear 35. It should be noted that the ring gear 35 does not mesh the second planet gears 34b. Thus, the rotor 21 functions as a ring gear of a planetary gear train 30. In short, the ring gear of the planetary gear train 30 is replaced by the rotor 21, thereby eliminating the ring gear of the planetary gear train 30. This has the benefit of decreasing space around the shaft 23.

The number of teeth of the first sun gear 32 is different from that of the second sun gear 33. In detail, the number of the teeth of the first sun gear 32 is an integer A, the number of the teeth of the second sun gear 33 is an integer B, and A is not equal to B. Further, the modulus of the first planet gear 34a is different from the modulus of the second planet gear 34b in which the first planet gear 34a rotates on the axle 34c, the second planet gear 34b rotates on the axle 34c as well, and both the first planet gear 34a and the second planet gear 34b rotate about the sun gear assembly 31. In detail, the modulus of the first planet gear 34a is X, the modulus of the second planet gear 34b is Y, and X is not equal to Y. The motor 20 activates to rotate the rotor 21. And in turn, the rotor 21 rotates the first planet gears 34a having the modulus X via the ring gear 35. The first planet gears 34a mesh the first sun gear 32 having the number of teeth A. The first sun g 32 is stationary. Thus, each first planet gear 34a may rotate about the axle 34c and the first planet gears 34a may rotate about the first sun gear 32 due to the provision of the first sun gear 32. Thus, revolutions of the first planet gear 34a are taken as a speed reduction ratio of a first stage which can be expressed below.

$$1 + \left(\frac{\text{number of teeth of the first sun gear}}{\text{number of teeth of the ring gear}}\right)$$

The first planet gear 34a and the second planet gear 34b are coaxially arranged. The rotor 21 rotates the first planet gear 34a which in turn rotates upon itself and about the first sun gear 32. The second planet gear 34b and the first planet gear 34a rotate in synchronism including rotation upon itself and revolving about the sun gear assembly 31. Thus, the speed reduction ratio of the first stage of the rotor 21 is transmitted to the first planet gear 34a via the first sun gear 32. And in turn, the speed reduction ratio of the first stage of the rotor 21 is transmitted to the second planet gear 34b via the co-rotated first planet gear 34a. Finally, the speed reduction ratio of the first stage of the rotor 21 is transmitted to the second sun gear 33.

In the speed reduction ratio of the first stage of the rotor 21, the first planet gears 34a having the modulus X mesh the first sun gear 32 having the number of teeth of A, and the second planet gears 34b having the modulus Y mesh the second sun gear 33 having the number of teeth of B. The first sun gear 32 is affixed to the housing 10 and is not rotatable. The rotor 21 rotates the first planet gears 34a which mesh the first sun gear 32. Thus, the first planet gears 34a may rotate upon itself and about the sun gear assembly 31. Also, the second planet gears 34b may rotate upon itself and revolve about the sun gear assembly 31. The number of the teeth of the first sun gear 32 is not equal to the number of the teeth of the second sun gear 33. Rotation is transmitted to the shaft 23 via the second planet gears 34b and the second sun gear 33 which is mounted on the shaft 23. Therefore, a speed reduction ratio of the second stage is rendered at the shaft 23. Speed of an electric bicycle incorporating the invention can be lowered. The speed reduction ratio of the second stage can be expressed below.

$$\frac{\text{number of teeth of the second sun gear}}{(\text{number of teeth of the second sun gear}) - (\text{number of teeth of the first sun gear})}$$

A final speed reduction ratio of the invention can be obtained and expressed below.

$$\left[1 + \left(\frac{\text{number of teeth of the first sun gear}}{\text{number of teeth of the ring gear}}\right)\right] \times \frac{\text{number of teeth of the first sun gear}}{(\text{number of teeth of the second sun gear}) - (\text{number of teeth of the first sun gear})}$$

Figure 5:
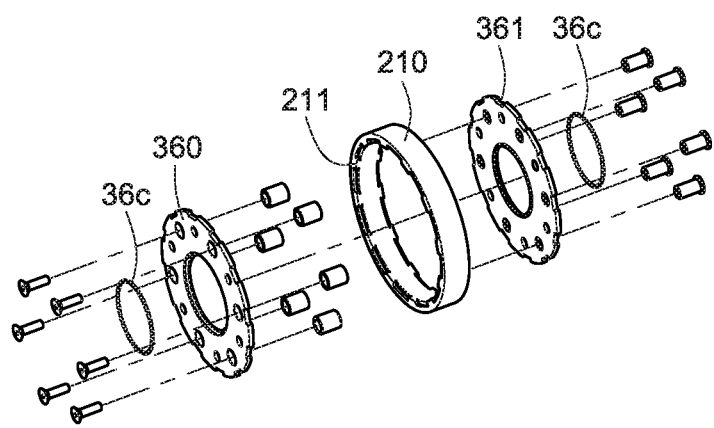
FIG. 5 is an exploded view of some components of a motorized gear reducer according to a second preferred embodiment of the invention.
Figure 6:
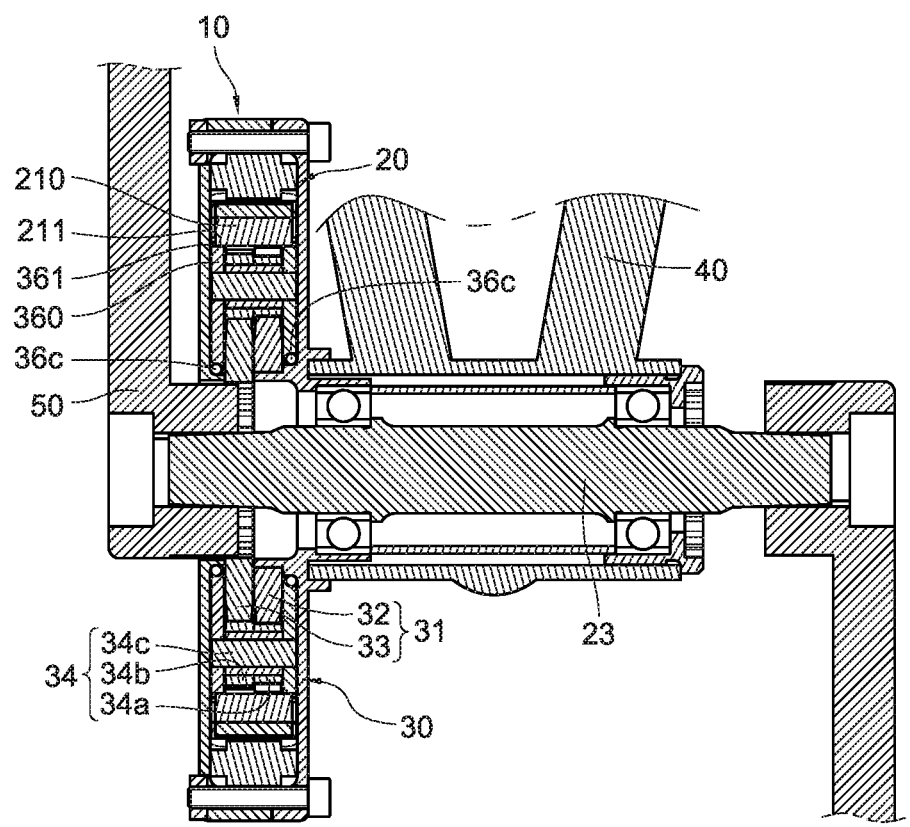
FIG. 6 is a longitudinal sectional view of a bottom bracket shell of a bicycle incorporating the second preferred embodiment of the invention.

Referring to FIGS. 5 and 6, a motorized gear reducer in accordance with a second preferred embodiment of the invention is shown. The characteristics of the second preferred embodiment are substantially the same as that of the first preferred embodiment except the following: There are no teeth on an inner surface of a rotor 210. An annular toothed portion 211 is formed on either end of the rotor 210. A toothed member 361 is formed on an annular edge of each of two planet gear discs 360. The toothed member 361 meshes with the toothed portion 211. Thus, the planet gear discs 360 are secured to two ends of the rotor 210 respectively. It noted that the meshing with engagement of the toothed member 361 and the toothed portion 211 can save space. Other methods such as threaded engagement and bolt engagement are also contemplated by the invention and are within the scope of the invention.

Rotation of the rotor 210 rotates the planet gear discs 360. Thus, torque can be transmitted from the rotor 210 to the planet gear assemblies 34 via the planet gear discs 360. Thus, a speed reduction ratio of multiple stages is rendered at the shaft 23. The planet gear discs 360 are rotated by the rotor 210 via the first planet gears 34a. The first planet gear 34a may rotate upon itself and revolve about the sun gear assembly 31 due to the first sun gear 32. Also, the second planet gear 34b may rotate upon itself and revolve about the sun gear assembly 31. Also, the number of teeth of the first sun gear 32 is not equal to that of the second sun gear 33. Torque is transmitted from the second planet gears 34b to the shaft 23 via the second sun gear 33. A speed reduction ratio of a single stage is rendered at the shaft 23. Finally, the torque is transmitted to wheels via sprockets and chains. In comparison with the typical planetary gear train, the greatly increased speed reduction ratio is made possible by utilizing difference between the number of teeth of the first sun gear 32 and the number of teeth of the second sun gear 33. A speed reduction ratio of a single stage can be expressed below.

$$\frac{\text{number of teeth of the second sun gear}}{(\text{number of teeth of the second sun gear}) - (\text{number of teeth of the first sun gear})}$$

In view of the above, it is easy to understand that the speed reduction ratio of multiple stage of the Invention comprises a speed reduction ratio of first and second stages or a single stage after rotating the rotor is practical. Torque is transmitted from the rotor to the planet gears, the sun gears, and the shaft sequentially. It is made possible by utilizing limited space and components are made simple. The motorized gear reducer can be implemented in limited space to be applicable to bicycles or other small devices having the need of speed reduction.

Figure 7:
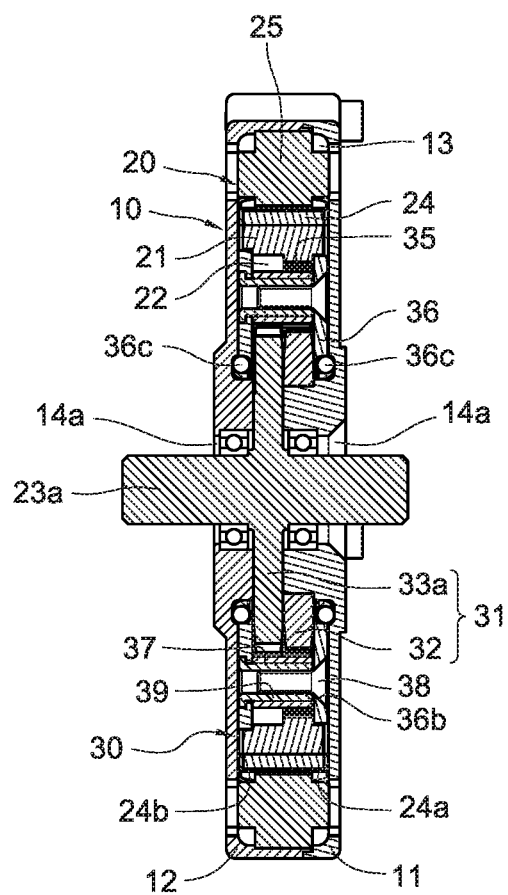
FIG. 7 is a longitudinal sectional view of a motorized gear reducer according to a third preferred embodiment of the invention.

Referring to FIG. 7, a motorized gear reducer in accordance with a third preferred embodiment of the invention is shown. The characteristics of the third preferred embodiment are substantially the same as that of the first or second preferred embodiment except the following: The shaft 23a is not the crank shaft through the bottom bracket shell of a bicycle. Thus, the shaft 23a is not affixed to the crank shaft. In other words, the shaft 23a passes through holes 14a to have one or two ends exposed as a torque output of the motorized gear reducer. The torque output is transmitted to an arm of a robot, a power tool, or a small device having the need of speed reduction. Further, the shaft 23a and the second sun gear 33a are formed integrally for decreasing the number of components.

Although the present invention has been described with reference to the foregoing preferred embodiments, it will be understood that the invention is not limited to the details thereof. Various equivalent variations and modifications can still occur to those skilled in this art in view of the teachings of the present invention. Thus, all such variations and equivalent modifications are also embraced within the scope of the invention as defined in the appended claims.

What is claimed is:

1. A motorized gear reducer comprising:
   a housing;
   a hollow motor disposed in the housing and including an annular rotor having a through hole, a shaft passing through the through hole, and a plurality of drive elements disposed on the annular rotor; and
   a planetary gear train disposed in the through hole of the annular rotor and placed on the shaft, the planetary gear train including a sun gear assembly having a first sun gear disposed in the housing, and a second sun gear disposed on the shaft; a plurality of planet gear assemblies equally spaced apart around the sun gear assembly, each including a first planet gear meshing with the first sun gear, and a second planet gear coaxially disposed with the first planet gear and meshing with the second sun gear; and a ring gear disposed on an inner surface of the annular rotor;
   wherein the annular rotor activates to rotate the first planet gears via the ring gear so that each first planet gear rotates upon itself, each second planet gear rotates upon itself, and both the first and second planet gears rotate about the sun gear assembly to render a speed reduction ratio of a first stage; and the second planet gears meshing with the second sun gear rotates the shaft to render a speed reduction ratio of a second stage.

2. The motorized gear reducer of claim 1, wherein the number of teeth of the first sun gear is different from that of the second sun gear.

3. The motorized gear reducer of claim 1, wherein a modulus of the first planet gear is different from that of the second planet gear.

4. The motorized gear reducer of claim 1, wherein the drive elements include an annular magnet placed on the annular rotor, and an annular stator placed on the annular magnet and fastened in the housing.

5. The motorized gear reducer of claim 1, further comprising two planet gear discs disposed on two ends of the planet gear assemblies respectively, and wherein the first and second planet gears of each planet gear assembly revolve about the sun gear assembly.

6. The motorized gear reducer of claim 5, wherein each planet gear assembly further comprises an axle disposed through the first and second planet gears, and wherein the ends of the planet gear assemblies are positioned by the planet gear discs.

7. The motorized gear reducer of claim 1, wherein the shaft is implemented as a crank shaft pivotably disposed through a bottom bracket shell, and the housing is secured to one end of the bottom bracket shell.

8. A motorized gear reducer comprising:
   a housing;
   a hollow motor disposed in the housing and including an annular rotor having a through hole, a shaft, rotatably fastened through the housing, passing through the through hole, the shaft having two ends connected to two crank arms respectively, each crank arm having one end connected to a pedal, and a plurality of drive elements disposed on the annular rotor; and
   a planetary gear train including a sun gear assembly having a first sun gear disposed in the housing, and a second sun gear disposed on the shaft; a plurality of planet gear assemblies, each including a first planet gear meshing with the first sun gear, and a second planet gear coaxially disposed with the first planet gear and meshing with the second sun gear; and two planet gear discs disposed on two ends of the annular rotor respectively and configured to equally space the planet gear assemblies apart around the sun gear assembly,
   wherein the annular rotor activates to rotate the planet gear assembly via the planet gear discs so that each first planet gear rotates upon itself, each second planet gear rotates upon itself, and both the first and second planet gears rotate about the sun gear assembly; and the second planet gears meshing with the second sun gear rotates the shaft to render a speed reduction ratio of multiple stages.

9. The motorized gear reducer of claim 8, wherein the number of teeth of the first sun gear is different from that of the second sun gear.

10. The motorized gear reducer of claim 8, wherein a modulus of the first planet gear is different from that of the second planet gear.

11. The motorized gear reducer of claim 8, wherein the drive elements include an annular magnet placed on the annular rotor, and an annular stator placed on the annular magnet and fastened in the housing.

12. The motorized gear reducer of claim 9, further comprising a toothed portion formed on either end of the annular rotor, and a toothed member formed on an edge of each planet gear disc, and wherein the toothed member meshes with the toothed portion.

13. The motorized gear reducer of claim 8, wherein each planet gear assembly further comprises an axle disposed through the first and second planet gears, and wherein the ends of the planet gear assemblies are positioned by the planet gear discs.

14. The motorized gear reducer of claim 8, wherein the shaft is implemented as a crank shaft rotatably disposed through a bottom bracket shell, and the housing is secured to one end of the bottom bracket shell.

\* \* \* \* \*